(12) United States Patent
Lozano et al.

(10) Patent No.: US 11,739,714 B2
(45) Date of Patent: *Aug. 29, 2023

(54) ELECTRICALLY-ACTUATED VALVE AND REGULATOR FOR ELECTROSPRAY THRUSTERS

(71) Applicant: Massachusetts Institute of Technology, Cambridge, MA (US)

(72) Inventors: Paulo C. Lozano, Arlington, MA (US); Dakota Freeman, Cambridge, MA (US); Jonathan MacArthur, Columbus, NE (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/506,411

(22) Filed: Oct. 20, 2021

(65) Prior Publication Data

US 2022/0195964 A1 Jun. 23, 2022

Related U.S. Application Data

(60) Provisional application No. 63/128,705, filed on Dec. 21, 2020.

(51) Int. Cl.
*F02K 9/58* (2006.01)
*F16K 31/02* (2006.01)
*F16K 13/00* (2006.01)

(52) U.S. Cl.
CPC ........... *F02K 9/58* (2013.01); *F16K 13/00* (2013.01); *F16K 31/02* (2013.01)

(58) Field of Classification Search
CPC .................................................. F03H 1/0037
See application file for complete search history.

(56) References Cited

U.S. PATENT DOCUMENTS 11,346,329 B2 * 5/2022 Lozano ............... F03H 1/0037

* cited by examiner

*Primary Examiner* — Arun Goyal
*Assistant Examiner* — William L Breazeal
(74) *Attorney, Agent, or Firm* — Wolf, Greenfield & Sacks, P.C.

(57) ABSTRACT

Electrical propulsion systems and related methods are generally described. In some embodiments, an electrical propulsion system may include an electrically-actuated valve to selectively permit flow of propellant from a reservoir tank to a thruster. The valve may physically isolate the propellant from the thruster when inactivated, exhibiting a non-wetting surface which may inhibit propellant from passing through the valve towards the thrusters. In some embodiments, a valve may be activated through application of a voltage potential to the valve relative to the propellant, which may change the wettability of the valve, permitting propellant to wet and subsequently pass through the valve. The voltage potential may be adjusted to vary the wettability of the valve, resulting in the valve effectively regulating propellant flow rate. The valve may include a conductive layer, a dielectric or insulating layer, and a non-wetting layer to enhance the non-wetting behavior of the valve.

18 Claims, 12 Drawing Sheets

ELECTRICALLY-ACTUATED VALVE AND REGULATOR FOR ELECTROSPRAY THRUSTERS

CROSS-REFERENCE TO RELATED APPLICATIONS

This application claims the benefit under 35 U.S.C. § 119(e) of U.S. provisional application Ser. No. 63/128,705, filed Dec. 21, 2020, the disclosure of which is incorporated by reference in its entirety.

GOVERNMENT FUNDING

This invention was made with Government support under NRO000-13-C-0516 awarded by the National Reconnaissance Office. The Government has certain rights in the invention.

FIELD

The disclosed embodiments are generally related to devices and methods for space propulsion. More specifically, methods and apparatuses including embodiments related to electrically-actuated valves for electrospray thrusters are disclosed.

BACKGROUND

Electric propulsion technologies such as ion engines and Hall effect thrusters make use of accelerating beams of ions with a combination of electric and magnetic fields to generate thrust. Electric propulsion systems typically feature higher specific impulse, the amount of thrust produced per unit flow rate of propellant used, and greater mass savings in comparison with chemical propulsion technologies.

Electric propulsion systems utilizing propellants may be actively fed (e.g., using pressure) or passively fed (e.g., using capillary forces). For example, electrospray thrusters, also known as electrospray emitter devices, are electric propulsion systems that produce thrust by accelerating ions from a source of ions in response to an applied potential above which Taylor Cones are formed. Some electrospray emitter devices use capillary forces to passively feed the emitter(s) with liquid propellant. The propellant (e.g., a source of ions) used in these electrospray emitters may be an ionic liquid, or other appropriate fluid, and may allow for a scalable specific impulse in some electrospray emitters for approximately 500 seconds to 5000 or more seconds. Depending on the application, a plurality of electrospray emitters can be arranged together (e.g., in a line or in an array) to produce a predetermined thrust, for use in applications such as space propulsion applications. Such emitters may be manufactured using a number of different fabrication techniques.

SUMMARY

In some embodiments, a propulsion system includes a reservoir tank configured to hold a propellant, at least one thruster, at least one valve positioned along a flow path between the reservoir tank and the at least one thruster, and a first power source electrically connected to the propellant and the at least one valve. In some embodiments, the at least one valve includes one or more through holes extending from a first surface of the at least one valve to a second surface of the at least one valve, and one or more channels fluidly connected to the one or more through holes, wherein in a first operating mode the first power source is configured to apply a first voltage potential to the at least one valve relative to the propellant to inhibit propellant flow through at least a portion of the at least one valve, and wherein in a second mode of operation the first power source is configured to apply a second voltage potential to the at least one valve relative to the propellant to permit propellant flow through at least a portion of the at least one valve.

In some embodiments, a valve includes a substrate, one or more through holes extending from a first surface of the substrate to a second surface of the substrate, one or more channels partially extending into the second surface of the substrate and fluidly connected to the one or more through holes, and one or more layers disposed on at least a portion of the substrate including the one or more channels and/or the one or more through holes, wherein the one or more layers are configured to electrically isolate the one or more through holes and the one or more channels from the substrate, and wherein the one or more layers are configured to provide a non-wetting surface on the one or more through holes and the one or more channels.

In some embodiments, a method of operating a propulsion system includes applying a first voltage potential to at least one valve relative to a propellant, wetting one or more through holes extending from a first surface of the at least one valve to a second surface of the at least one valve in response to the applied voltage potential, and wetting one or more channels in fluid communication with the one or more through holes, wherein wetting the one or more through holes and wetting the one or more channels places the propellant in fluid communication with a thruster.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
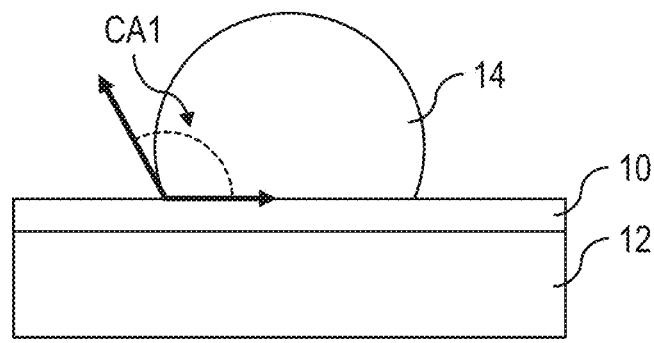
FIGS. 1A-1B show, according to some embodiments, an electrowetting surface.

Electrical propulsion systems (e.g., electrospray thrusters) are devices that may be used to provide mobility to spacecraft once the thrusters leave planetary atmospheres. Electrospray thrusters may feature a number of advantages over more conventional forms of space propulsion, including high compactness and performance. Important phases of the deployment of propulsion systems in space systems may include storage of propulsion systems within the atmosphere of the earth at ground level, which may be quite prolonged, and the launch itself, in which rocket payloads are exposed to fast de-pressurization and severe vibrations.

In some cases, an electrospray thruster may include a propellant delivery system which is not pressurized, but rather exposed to the external environment. The liquid propellant may flow through the thruster, towards a porous structure containing a multiplicity of emitter tips. The thruster may generate thrust when a voltage is applied to the propellant within a reservoir, causing ions of the propellant to evaporate away from the tips. As such, the pressure in the reservoir matches the pressure of the environment. The propellant may therefore be retained in the reservoir through surface tension forces alone.

The Inventors have appreciated that premature propellant wetting of the emitter tips may result in liquid spillage during storage and/or launch conditions, which may lead to thruster damage or failure. Thus, the Inventors have recognized that the liquid propellant should ideally be physically isolated or otherwise prevented from reaching the emitter bodies prior to thruster firing.

In some cases, propulsion systems may include a one-time electrowetting valve capable of isolating the propellant from the emitters prior to initial operation of the thruster. The one-time valve may be electrically actuated to an open state to allow propellant to flow from the reservoir to the emitters. However, such valves may be incapable of closing after initial operation, to once again physically isolate the propellant from the emitters. Given the capillary forces with which the propellant flows through the thruster, in some cases, the surface tension forces pull propellant towards the emitter tips even without any applied feeding pressure or potential difference. The Inventors have recognized that this passive flow of propellant may result in propellant flooding the curved surface contours between neighboring emitter tips. Although propellant flow through porous materials may be slow, depending on the wettability of the material and surface tension properties of the propellant, flooding may still occur frequently enough to pose a risk of system failure through uncontrolled propellant flow.

Furthermore, existing electrowetting valves operate on a binary basis, such that the valve is either off, inhibiting propellant flow through the valve, or on, permitting propellant flow, and thus, are unable to regulate propellant flow rate. The propellant flow rate may be determined by the balance of the pulling force of the applied voltage (given a conductive propellant) and the thruster's hydraulic resistance.

Based on the foregoing, the Inventors have recognized the benefits associated with an electrically-actuated valve for a propulsion system which may be capable of controlling the flow and flow rate of propellant to a thruster. The valve may be electrically actuated to selectively permit propellant flow to one or more emitter tips after initial activation of the thruster, and may be capable of independently controlling the flow rate with which the propellant flows to the emitters. For example, in some embodiments, a valve may control or regulate flow rate by adjusting its hydraulic resistance—which may result in better control over emitted thruster current, as well as exhaust composition. Such a valve may also be integrated into the propulsion system in a manner which does not impact the overall compactness of the propulsion system in some embodiments.

In some embodiments, a propulsion system may include a reservoir tank containing a propellant, a thruster, such as an electrospray thruster, and at least one valve disposed between the reservoir and the thruster such that the valve is disposed along a flow path extending between the reservoir and the thruster. The at least one valve may include one or more through holes that extends from a first surface of the at least one valve to a second surface of the at least one valve, where the second surface of the valve is located opposite the first surface, though the use of non-linear through holes extending to non-opposing surfaces are also contemplated. In some embodiments, the at least one valve may also include one or more open channels formed only on one surface of the valve, fluidically connected to the through holes. Accordingly, when the valve is on, the propellant may flow from the reservoir, through the through holes of the valve, across the open channels of the valve, and towards one or more emitters of the thruster.

The propulsion system may also include a power source that is electrically connected to the propellant in any appropriate configuration. The power source may also be electrically connected to the at least one valve. Prior to operation, the one or more through holes and open channels of the valve may be substantially free of the propellant as the channels are not wetted by the propellant in a first mode of operation in which a voltage potential less than a threshold voltage is applied to the valve. Accordingly, in this arrangement the valve may inhibit the flow of propellant from the reservoir to the thruster. During operation, the power supply may apply a voltage potential to the at least one valve that is greater than a threshold voltage relative to the propellant located in the reservoir. The applied voltage potential may cause the propellant to wet the one or more through holes, the open channels, or both structures of the valve. Once the one or more through holes and channels are wet with the propellant, the propellant may flow from the reservoir through the valve to the thruster.

In some embodiments, the valve may be compatible with conventional electric propulsion systems, capable of supporting the rigors of a launch environment, while being integrated into a small form factor of existing MEMS-based thruster packages. Accordingly, the valve may withstand simultaneous strong vibrations and quick de-pressurization.

In view of the above, in some embodiments, a valve may operate with the principles of electrowetting. In its inactivated state—when propellant flow from the reservoir to the thruster is generally inhibited—the valve may exhibit non-wetting properties, such that a contact angle of the propellant on a surface of the valve may be higher than 90°, and/or any other appropriate angle. To activate the valve (i.e., when the power supply applies a voltage potential to the valve relative to the propellant), the contact angle of the propellant may decrease from a first larger contact angle to a second smaller contact angle. Thus, the propellant (which may, in some embodiments, be conductive) may overcome surface tension forces and increase its contact area with the valve—permitting flow. As will be described in greater detail below, the open channels of the valve may function as liquid bridges when the valve is activated, permitting fluid flow through the valve and towards the emitters of the thruster. The flow rate of propellant across the open channels may be modulated by controlling the voltage potential applied to the valve, allowing the valve to regulate propellant flow rate by changing the wetting angle of the propellant with the surfaces of the valve as a function of voltage.

It should be appreciated that the term "inactivated" as used herein may refer to the "closed" state of the valve in which propellant is inhibited from flowing through. Accordingly, in some embodiments, the valve may be grounded relative to the propellant to achieve the inactivated state. In other embodiments, the power supply may apply a voltage potential below the threshold potential required for the valve to transition from non-wetting to wetting.

In some embodiments, an electrically-actuated valve may be integrated into a propulsion system as a separate device disposed between a thruster and an associated propellant reservoir of a propulsion system. Alternatively, in other embodiments, the electrically-actuated valve may be integrally formed with one or more components of a propulsion system. For example, a support for a thruster may include an electrically-actuated valve integrally formed with the support. This may simplify the integration of the electrowetting valve into a propulsion system, as well as simplifying electrical connections with the system. Additionally, due to the compact construction of the disclosed electrically-actuated valves, in some embodiments multiple valves may be used in series with one another. In such an embodiment, a plurality of valves may be disposed on one another such that they are located in series between a thruster and an associated propellant reservoir such that propellant flows from the reservoir through the plurality of valves and to the thruster. This may provide redundancy in the isolation of a propellant reservoir from an associated thruster. In view of the foregoing, it should be understood that the various embodiments of electrically-actuated valves disclosed herein may be integrated into a propulsion system in any appropriate way and any number of valves may be used in a particular propulsion system as the disclosure is not limited in this manner.

The compact construction of the disclosed valves as well as their simple actuation using an applied voltage potential offer multiple potential benefits for various types of propulsion systems. For example, the disclosed valves may be easily integrated into any number of different propulsion systems during the fabrication of the propulsion system itself. Alternatively, the disclosed compact valves may also be easily integrated into a flow path extending between a propellant reservoir and a thruster. In either case, the proposed valves may provide the desired functionality while offering a compact construction and small weight addition. It is also expected that the disclosed valves may facilitate reliable operation of thrusters without adding serious complexity to their design. Of course, while several potential benefits are listed above, it should be understood that embodiments in which not all of the listed benefits and/or different benefits are provided by a valve are also contemplated as the disclosure is not limited to only the listed benefits.

It should be understood that the various embodiments of valves disclosed herein may include a number of different layers and/or substrates. These layers and/or substrates may be made using any appropriate combination of materials to provide the desired functionality. However, in some embodiments, the materials and component constructions may also be selected such that they are compatible with the propellant contained in a reservoir of a propulsion system, capable of withstanding the rigors of a launch environment (e.g., vibration, shock, etc.), and/or capable of being integrated into small form factors.

In some embodiments, a substrate of a valve in the embodiments disclosed herein may correspond to any appropriate semiconducting or electrically conducting material. This may include semiconductors such as silicon, germanium, and gallium arsenide; metallic materials such as copper, aluminum, gold, platinum, and stainless steel; non-conductive substrates such as glass, silica, quartz, various ceramics, polymers, and other non-conductive materials coated with a conductive material, combinations of the forgoing materials, and/or any other appropriate material. Accordingly, it should be understood that a substrate of a valve may be formed using any material with sufficient conductivity such that an electrical potential may be applied to the material relative to a propellant of a propulsion system to electrostatically polarize an interface of the valve to wet a one or more through holes and open channels formed in the valve with the propellant.

In some embodiments, electrically-actuated valves of the present disclosure may include at least one conductive layer (which may be the substrate), through which a voltage potential relative to the propellant may be applied, at least one insulating or dielectric layer, to prevent a short circuit between the propellant flowing along the valve and the conductive layer, and, in some embodiments, at least one non-wetting layer. The non-wetting layer may enhance the non-wettability of the insulating or dielectric layer, such that the valve may inhibit propellant flow in its inactivated state. In some embodiments, the substrate may not be electrically conducting, but may be covered at least partially with an electrically conducting layer to polarize one or more interfaces of the valve. Accordingly, the valve may be formed of a non-conducting substrate, at least one conductive layer, at least one dielectric layer, and at least one non-wetting layer. In some embodiments, the dielectric layer may be sufficiently non-wetting, such that a single layer may function as both the dielectric layer and the non-wetting layer.

The substrate may subsequently be coated with a dielectric layer to reduce the risk of short circuit between the conductive propellant and the conductive valve substrate. The dielectric layer may have a sufficient dielectric constant and corresponding layer thickness capable of avoiding dielectric breakdown when exposed to the voltage potentials applied to the valve. Exemplary materials may include, but are not limited to: oxides such as silicon dioxide ($SiO_2$), alumina ($Al_2O_3$), and oxides of the underlying substrate; nitrides such as silicon nitride and/or nitrides of the underlying substrate; non-conductive polymer layers such as a high-quality polytetrafluoroethylene (PTFE) layer, which in some embodiments may also function as a non-wetting layer; and/or any other appropriate sufficiently insulating material capable of reducing the risk of dielectric breakdown and shorting within a valve during operation. It should be appreciated that one or more dielectric layers may be employed to assist in electrical insulation of the conductive valve substrate and the conductive propellant.

It should be appreciated that the dielectric layer may have any appropriate thickness depending on the particular material being used, in order to provide a desired amount of electrical insulation between a substrate of a valve and the propellant. In some embodiments, the dielectric layer may be present on all exterior surfaces of a valve exposed to materials and/or components of a propulsion system at a different voltage potential relative to the substrate during operation. Of course, instances in which only sections of an exterior surface of the valve include the dielectric layer are also contemplated. For example, electrical contacts, such as metallization layers, and/or bare sections of the substrate, may be present on portions of a substrate where the substrate is in contact with components and/or materials at substantially the same potential as the substrate. In either case, where the dielectric layer is present on an exterior surface of the valve, which may include the surfaces of the through holes and/or open channels formed in the substrate, dielectric layer may have any appropriate thickness to provide a desired amount of electrical insulation. An appropriate thickness of a dielectric layer may be greater than or equal to 0.5 µm, 1 µm, 2 µm, 3 µm, 4 µm, 5 µm, 10 µm, and/or any other appropriate thickness. Correspondingly, the thickness of a dielectric layer may be less than or equal to 10 µm, 5 µm, 4 µm, 3 µm, 2 µm, 1 µm, 0.5 µm and/or any other appropriate thickness. Combinations of the above noted ranges of a thickness of a dielectric layer are contemplated, including, for example, thicknesses between or equal to 0.5 µm and 10 µm. Of course, dielectric layers with thicknesses both less than and greater than those noted above are possible depending on the particular dielectric material used and the electrical potentials to be applied to a particular electrically-actuated valve.

In some embodiments, the non-wetting behavior of the valve (i.e., inhibiting flow across a valve to a thruster) may be enhanced with the addition of a non-wetting layer on the dielectric layer disposed on at least a portion of an upstream surface of a valve contacting a propellant of a propulsion system prior to opening of the valve. In some embodiments, the non-wetting layer may also be disposed on the surfaces of the through holes extending through a substrate, channels formed in the substrate, and/or other portions of the substrate's exterior surface as the disclosure is not limited to only being disposed on specific portions of the substrate. Regardless, the non-wetting layer may have a lower surface energy than the underlying substrate and dielectric layer. However, embodiments in which a material functions as both a dielectric layer and a non-wetting layer are also contemplated. Appropriate types of materials which may be used to form the non-wetting layer may include, but are not limited to, fluoropolymers such as polytetrafluomethylene (PTFE), fluorinated ethylene propylene (FEP), and amorphous fluoroplastics; hydrophobic silanes (e.g., fluorinated silanes); rare-earth oxides such as cerium oxide; and/or combinations of the forgoing. Of course, it should be understood that any appropriate material exhibiting a desired non-wetting behavior, which may be compatible with the propellant, may be used to form the non-wetting layer of a valve as the disclosure is not limited to any particular material.

It should be appreciated that the term "disposed" used herein may refer to a first layer and/or structure arranged in direct contact with a second layer and/or structure. The term "disposed" may also refer to a first layer and/or structure in indirect contact (e.g., no physical contact) with the second layer and/or structure, as the present disclosure is not so limited. For example, if a structure includes three layers arranged as A. B, and C, layer A may be described to be disposed on both layers B (direct) and C (indirect).

In some embodiments, it may be desirable for a non-wetting layer to be of sufficient quality to avoid the layer having defects, such as bare sections of substrate, which may affect the functionality of the non-wetting layer in helping to reduce the risk of unintentional wetting of the valve with a propellant. Accordingly, a non-wetting layer may have a sufficient thickness to provide a desired high-quality layer that exhibits a desired combination of surface properties for the valve. In some embodiments, a thickness of a non-wetting layer disposed on a surface of a substrate contacting a propellant of the valve may be greater than or equal to 50 nm, 100 nm, 200 nm, 300 nm, 400 nm, 500 nm, 700 nm, 1 µm, 5 µm, and/or any other appropriate thickness. Correspondingly, a thickness of the non-wetting layer may be less than or equal to 5 µm, 1 µm, 700 nm, 500 nm, 400 nm, 300 nm, 200 nm, 100 nm, 50 nm, and/or any other appropriate thickness. Combinations of the above ranges are contemplated, including, a thickness of a non-wetting layer that is between or equal to 50 nm and 5 µm. Of course, embodiments in which a non-wetting layer has a thickness either less than or greater than those noted above are also contemplated as the disclosure is not so limited. It should be appreciated that in some embodiments, more than one non-wetting layer may be employed, as the present disclosure is not limited by the type, thickness, position, and/or number of layers of the non-wetting layer(s).

Depending on the particular material selected from the non-wetting layer, the layer may be deposited using any appropriate deposition method, including, but not limited to, chemical vapor deposition, physical vapor deposition, sputtering, electrochemical deposition, plasma-enhanced chemical vapor deposition, thermal/e-beam evaporation, atomic layer deposition, and/or any other appropriate deposition method depending on the particular material being deposited.

An electrically-actuated valve as described herein may be designed to provide any desired flow rate or range of flow rates for a desired application. Appropriate design parameters which may be considered when designing an electrically-actuated valve for a particular flow rate may include, but are not limited to, through hole and open channel size, through hole and open channel density, aspect ratio of the through holes and open channels, voltage-dependent surface wetting properties of the through holes and open channels, and/or any other appropriate design parameter. Exemplary ranges for these parameters are provided below. However, it should be understood that ranges of these parameters both greater than and less than those noted below are contemplated as different propulsion systems may need flow rates that necessitate the use of different ranges of these design parameters.

In some embodiments, through holes formed in the valve may be sized to reduce the risk of propellant flow through the valve prior to operation (e.g., during storage and/or launch load conditions). For example, in some embodiments, the through holes may have an average hydraulic diameter of less than or equal to 20 µm. In some embodiments, the through holes may have an average hydraulic diameter greater than or equal to 0.5 µm, 1 µm, 1.5 µm, 2 µm, 3 µm, 5 µm, 7 µm, 10 µm, 12 µm, 15 µm, 18 µm, 20 µm, 50 µm, 100 µm, and/or any other suitable average hydraulic diameter. The average hydraulic diameter of the through holes may also be less than or equal to 100 µm, 50 µm, 20 µm, 18 µm, 15 µm, 12 µm, 10 µm, 7 µm, 5 µm, 3 µm, 2 µm, 1.5 µm, 1 µm, 0.5 µm, and/or any other suitable average hydraulic diameters. Combinations of the foregoing ranges are also contemplated, including, for example, an average hydraulic diameter that is between 0.5 µm and 100 µm, 1 µm and 20 µm, and/or any other suitable range. Of course, other ranges, including ranges both greater than and less than those noted above are also contemplated as the present disclosure is not so limited. It should be appreciated that the average hydraulic diameter may be selected to suit a particular combination of a propellant (and its associated fluid properties, such as viscosity) and valve properties (and its associated surface wetting properties, such as surface energy). Accordingly, the present disclosure is not limited by the average hydraulic diameter of the through holes.

In some embodiments, the number of through holes formed in the substrate of the valve may be selected to achieve a desired flow rate of propellant through the valve. In some embodiments, the valve may include one through hole. The valve may include any suitable number of through holes, including, greater than or equal to one thousand, ten thousand, fifty thousand, one hundred thousand, two hundred thousand, five hundred thousand, and/or any other suitable number of through holes. The valve may also include less than or equal to five hundred thousand, two hundred thousand, one hundred thousand, fifty thousand, ten thousand, one thousand, and/or any other suitable number of through holes. Combinations of the foregoing ranges are also contemplated, including, for example, a valve including between one thousand and five hundred thousand through holes, and/or any other suitable range. Of course, other ranges, including ranges both greater than and less than those noted above are also contemplated as the present disclosure is not so limited. It should be appreciated that the number of through holes may be selected to suit a particular combination of a propellant (and its associated fluid properties, such as viscosity) and valve properties (and its associated surface wetting properties, such as surface energy). Accordingly, the present disclosure is not limited by the number of through holes.

In some embodiments, open channels formed in one surface of the valve may be sized to reduce the risk of propellant flow through the valve prior to operation (e.g., during storage and/or launch load conditions). As will be described in greater detail below, the open channels may contribute to the valve's regulating properties. Accordingly, the open channels may have an open cross-sectional area (open to the environment on at least one end) with a hydraulic diameter. For example, in some embodiments, the open channels may have an average open hydraulic diameter of less than or equal to 10 µm. In embodiments where the cross-sectional area of the open channels is square shaped, the hydraulic diameter may represent the width of the channel. In some embodiments, the open channels may have a hydraulic diameter greater than or equal to 0.5 µm, 1 µm, 1.5 µm, 2 µm, 3 µm, 5 µm, 7 µm, 10 µm, 12 µm, 15 µm, 18 µm, 20 µm, 50 µm, 100 µm, and/or any other suitable average hydraulic diameter. The average hydraulic diameter of the open channels may also be less than or equal to 100 µm, 50 µm, 20 µm, 18 µm, 15 µm, 12 µm, 10 µm, 7 µm, 5 µm, 3 µm, 2 µm, 1.5 µm, 1 µm, 0.5 µm, and/or any other suitable average hydraulic diameters. Combinations of the foregoing ranges are also contemplated, including, for example, an average hydraulic diameter that is between 0.5 µm and 100 µm, 1 µm and 20 µm, and/or any other suitable range. Of course, other ranges, including ranges both greater than and less than those noted above are also contemplated as the present disclosure is not so limited. It should be appreciated that the average hydraulic diameter may be selected to suit a particular combination of a propellant (and its associated fluid properties, such as viscosity) and valve properties (and its associated surface wetting properties, such as surface energy). Accordingly, the present disclosure is not limited by the average hydraulic diameter of the open channels.

It should be appreciated that in some embodiments, the open channels may be shallow (e.g., may not extend significantly into the substrate of the valve), such that deposition of the dielectric and/or non-wetting layers on the channels may substantially change the thickness of the channels. Accordingly, the channel geometry may be designed to accommodate the added thickness of other layers during fabrication, achieving a final channel cross-sectional area exhibiting desirable wetting properties.

As described with reference to the through holes, the valves of the present disclosure may include any suitable number of open channels, as the present disclosure is not so limited. The valve may include any suitable number of open channels, including, greater than or equal to one thousand, ten thousand, fifty thousand, one hundred thousand, two hundred thousand, five hundred thousand, and/or any other suitable number of open channels. The valve may also include less than or equal to five hundred thousand, two hundred thousand, one hundred thousand, fifty thousand, ten thousand, one thousand, and/or any other suitable number of open channels. Combinations of the foregoing ranges are also contemplated, including, for example, a valve including between one thousand and five hundred thousand open channels, and/or any other suitable range. Of course, other ranges, including ranges both greater than and less than those noted above are also contemplated as the present disclosure is not so limited. It should be appreciated that the number of open channels may be selected to suit a particular combination of a propellant (and its associated fluid properties, such as viscosity) and valve properties (and its associated surface wetting properties, such as surface energy). Accordingly, the present disclosure is not limited by the number of open channels.

It should be appreciated that the arrangement of various features on the valve (e.g., number and spacing of the through holes and open channels) may be balanced with the corresponding dimensions of said features to provide a desired flow rate of propellant through the valve during operation. In some embodiments, the arrangement of the through holes and open channels of the valve may be optimized to reduce the overall footprint of the valve with respect to the propulsion system, while accommodating the desired propellant flow rate. Accordingly, any suitable arrangement of through holes and open channels (including feature size, distribution, spacing, uniformity, position, etc.) may be employed for a desired propellant and application, as the present disclosure is not so limited.

Depending on the particular application and design parameters, an electrically-actuated valve as described herein may be actuated with any appropriate voltage potential. As described further below, this voltage potential may be applied to the valve using the same power source used to operate a propulsion system and/or a separate power source as the disclosure is not limited in this fashion. In either case, an appropriate actuation voltage potential may be applied to actuate the valve to permit flow there through. Exemplary voltage potentials which may be applied to a valve to permit propellant flow through the valve (e.g., through the aforementioned through holes and/or open channels) may be greater than or equal to 10 V, 25 V, 50 V, 100 V, 200 V, 500 V, 1 kV, 2 kV, and/or any other appropriate voltage potential. The voltage potential may also be less than or equal to 2 kV, 1 kV, 500 V, 200 V, 100 V, 50 V, 25 V, 10 V and/or any other appropriate voltage potential. Combinations of the above voltage potential ranges applied to a valve are contemplated, including, voltage potentials between or equal to 10 V and 2 kV and/or any other appropriate voltage potential including ranges both greater than and less than those noted above, as the disclosure is not limited to any particular range of voltages.

In some embodiments, it may be desirable to facilitate flow between an electrically-actuated valve and a propellant reservoir and/or an associated thruster. Accordingly, in some embodiments, one or more wicking materials may be used to facilitate the flow of fluid between these various components of a propulsion system as described further below. It should be understood that any appropriate wick material may be used to passively feed propellant to and/or from one or more thrusters, emitters, propellant reservoirs, one or more valves, and/or any other components of a propulsion system. In some embodiments, a wick may be made from a material that is configured such that the propellant may be continuously transported through capillarity through the wick. For example, propellant may be transported through capillarity from a reservoir, through an activated valve, and to a distal tip of an emitter body of a thruster so as to provide propellant without an active pump. Non-limiting examples of structures capable of functioning as a wick to passively transport propellant within a propulsion system may include, but are not limited to, materials such as glass fibers, paper fibers, porous materials, structures including grooves, cylindrical tubes, thin plate-shaped openings, a combination of the forgoing, and/or any other appropriate structure capable of transporting a propellant through capillary induced flow.

In some embodiments, one or more wicking materials may include a pore size gradient such that the pores of the wick decrease in size in a direction along a flow path passing from the propellant reservoir towards a fluidly connected thruster. For example, in one embodiment, the one or more components of a propulsion system may be assembled such that a network of pores extends from the reservoir to an emitter body or bodies of an electrospray thruster. Further, to help facilitate the flow of propellant toward the outlet, in a propulsion system including one or more porous components, a pore size gradient across the one or more components may be selected such that the pore size of the different components decreases in a downstream direction directed towards the tip of one or more emitter bodies, or other appropriate outlet of a thruster of the propulsion system. In such an embodiment, the average pore size of upstream components may be larger than the average pore size of the associated downstream components.

While specific constructions and materials are noted above, it should be understood that any wick made from an appropriate material and/or including an appropriate structure capable of passively transporting propellant to a desired portion of a propulsion system may also be used, as the disclosure is not so limited. Alternatively, embodiments in which propellant is actively fed to a thruster of a propulsion system using a pump or other active system after a valve has been opened are also contemplated. In embodiments in which a pump, or other component, is used to actively transport propellant from a reservoir to a thruster, the valve may be constructed to resist wetting when subjected to the pressures associated with active transport of the propellant and/or a pump, or other component, used to transport the propellant may not be operated until it is desired to actuate the valve and operate the system.

It should be understood that the valves described herein may be compatible with any desired propulsion device and application, as well as with any appropriate type of ion source, such as a propellant, which may be used with the embodiments disclosed herein. The ion source may include, for example, a source of ions which may be liquid at the desired operating temperatures including, but not limited to, an ionic liquid, a room-temperature molten salt, and/or any other appropriate ion source. Examples of ionic liquids that may be used as liquid ion sources may include but are not limited to EMI-$BF_4$ (1-ethyl-3-methylimidazolium tetrafluoroborate), EMI-$CF_3BF_3$ (1-ethyl-3-methylimidazolium trifluoromethyltrifluoroborate), EMI-$GaCl_4$ (1-ethyl-3-methylimidazolium tetrachlorogallate), EMI-Im (1-ethyl-3-methylimidazolium bis(trifluoromethylsulfonyl)imide), mixtures containing EMIF-2.3 HF (1-ethyl-3-imidazolium fluoride), BMI-$BF_4$ (1-butyl-3-methylimidazolium tetrafluoroborate), BMI-$CF_3BF_3$ (1-butyl-3-methylimidazolium trifluoromethyltrifluoroborate). BMI-$GaCl_4$ (1-butyl-3-methylimidazolium tetrachlorogallate), BMI-Im (1-butyl-3-methylimidazolium bis(trifluoromethylsulfonyl)imide), or mixtures containing BMIF-2.3 HF (1-butyl-3-imidazolium fluoride). It should be appreciated that any suitable ionic liquid, or other ion source, capable of providing sufficiently high conductivity and high surface tension for a desired application may be used as the present disclosure is not so limited.

For the sake of clarity, the various embodiments described herein are primarily directed to propulsion systems including electrospray thrusters where one or more emitter bodies, including, for example, a plurality of emitter bodies arranged in an array, are operated to emit a stream of ions to produce thrust. However, it should be understood that an electrically-actuated valve as described herein may be used in any suitable propulsion system having any suitable propellant and/or thruster as the disclosure is not so limited. Additionally, applications of the disclosed valves to any system controlling the flow of a conductive fluid between two or more points of a fluid circuit are also contemplated as the disclosure is not limited to the current valves only being limited to thruster and/or electrospray applications.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
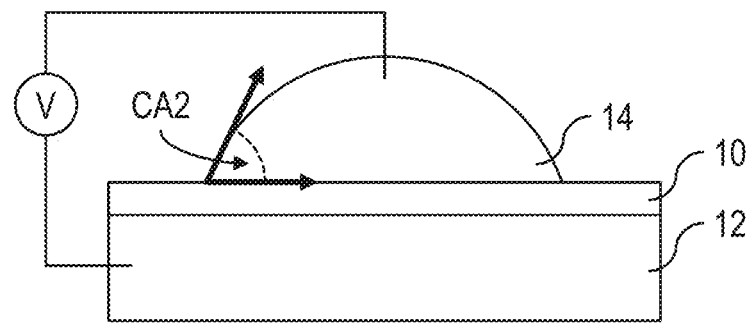

FIGS. 1A-1B show, according to some embodiments, the principle of operation of electrowetting, where the wettability of a surface may be controlled by an applied electric field. In some cases, a non-wettable surface may be rendered more wettable by a conductive liquid after charges electrostatically polarize the interface between the liquid and the material surface. As shown in FIG. 1A, a conductive substrate 12 may be coated with a dielectric or insulating layer 10, which may be nominally non-wetting. As such, a droplet of water 14 (or other conductive liquid) placed on the layer 10 may exhibit a high contact angle (e.g., contact angle CA1), when surrounded by a generally insulating fluid (e.g., air). This contact angle may be reduced by applying a voltage potential across the droplet 14 and substrate 12, as shown in FIG. 1B, where contact angle CA2 is less than contact angle CA1. The applied electric field provides excess energy to the droplet to overcome its surface tension and increase its contact area with the layer 10.

Figure 2:
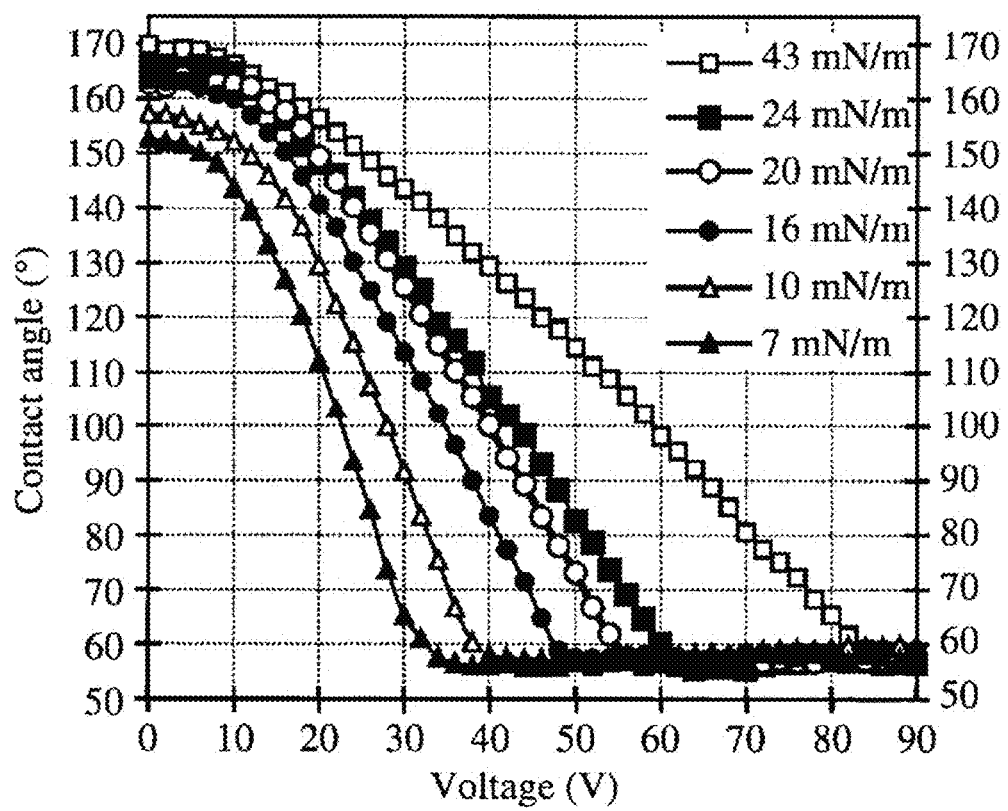
FIG. 2 shows, according to some embodiments, a plot of contact angle as a function of voltage for an electrowetting surface.

FIG. 2 shows a plot of contact angle as a function of applied voltage potential for fluids with various surface tensions. As shown, for every fluid, regardless of its surface tension, the contact angle of the fluid can be reduced by applying a steadily increasing voltage potential until the fluid reaches a saturation contact angle. It should be appreciated that contact angles above 90° are generally considered to be non-wetting (e.g., hydrophobic, in the case of water or aqueous solutions), and those below 90° are generally considered to be wetting (e.g., hydrophilic).

Figure 3:
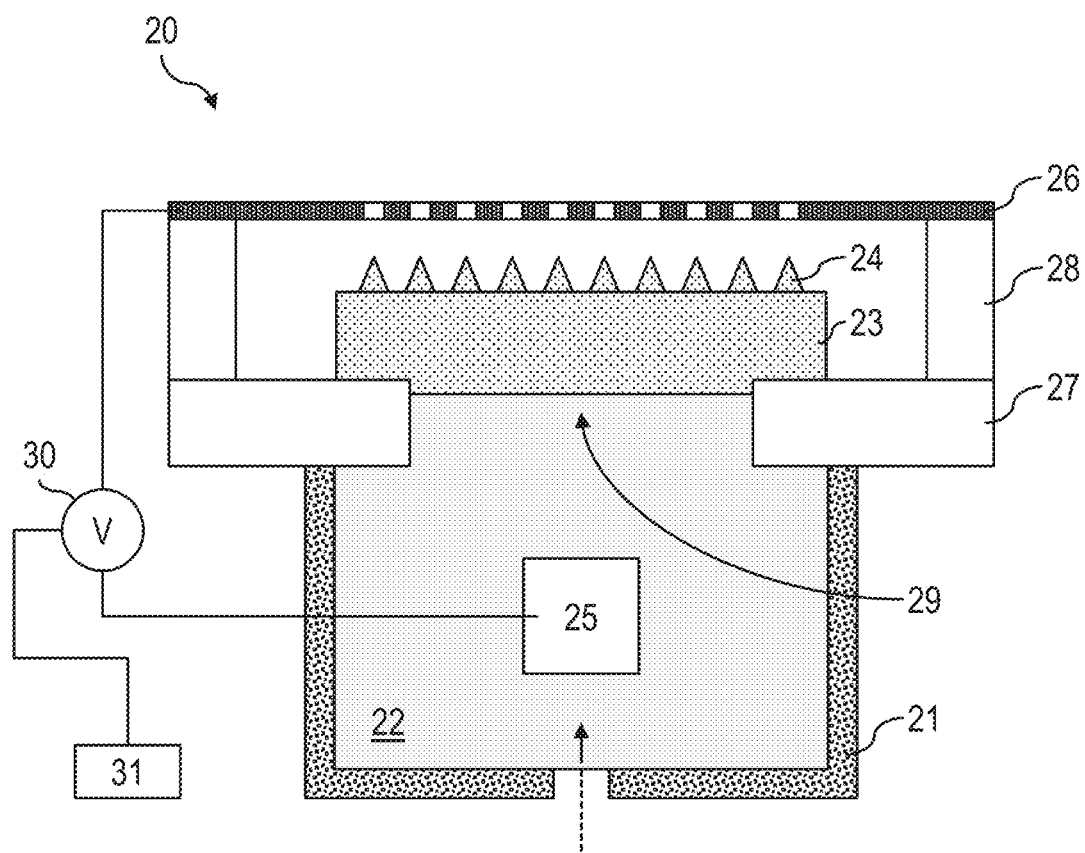
FIG. 3 shows, according to some embodiments, a prior art propulsion system.

FIG. 3 shows a prior art propulsion system 20 which does not exhibit any features to physically isolate the propellant from the emitters prior to operation (e.g., during launch and/or storage). The propulsion system 20 may be an ionic electrospray system, wherein a high voltage may be applied to an ionic liquid (e.g., the propellant) to induce flow through an array of sharp tips, and subsequent ionic evaporation, which may result in thrust. In such a system, a power source 30 (controlled with one or more controllers 31) may apply a voltage across electrodes 25, 26, as shown in FIG. 3. One electrode 25 may be positioned in a gas permeable reservoir 21 filled with a propellant 22. Accordingly, applying a voltage to the electrode 25 may energize the propellant 22, and drive said propellant towards electrode 26. Electrode 26 may be referred to as an extractor electrode, due to its function "extracting" ionic vapor from emitters 24 extending from an emitter base 23. The electrode 26 may be supported by a support 27 and spacer 28 to electrically isolate the electrode 26 from the propulsion system. The propellant 22 may flow from the reservoir 21 through the emitter base 23 connected to the array of emitters 24, which may emit ionic vapor resulting in thrust. The emitter base 23 and emitters 24 may be formed of a porous and/or granulated material, such that propellant 22 may flow through said features by a combination of electrical driving force as well as capillarity, which may be particularly useful in spaceflight applications without gravity. In some embodiments, the reservoir 21 may be formed of a gas-permeable material to permit vapor components of the propellant 22 to flow out through the reservoir upstream of the emitters 24.

In the propulsion system 20 shown in FIG. 3, propellant 22 may flow from the reservoir 21 towards the emitters 24 through a passive port 29. As noted previously, the Inventors have recognized that such a configuration may not controllably separate the propellant 22 from the emitters 24 to reduce the risk of premature wetting of the emitters 24 before firing.

Figure 4:
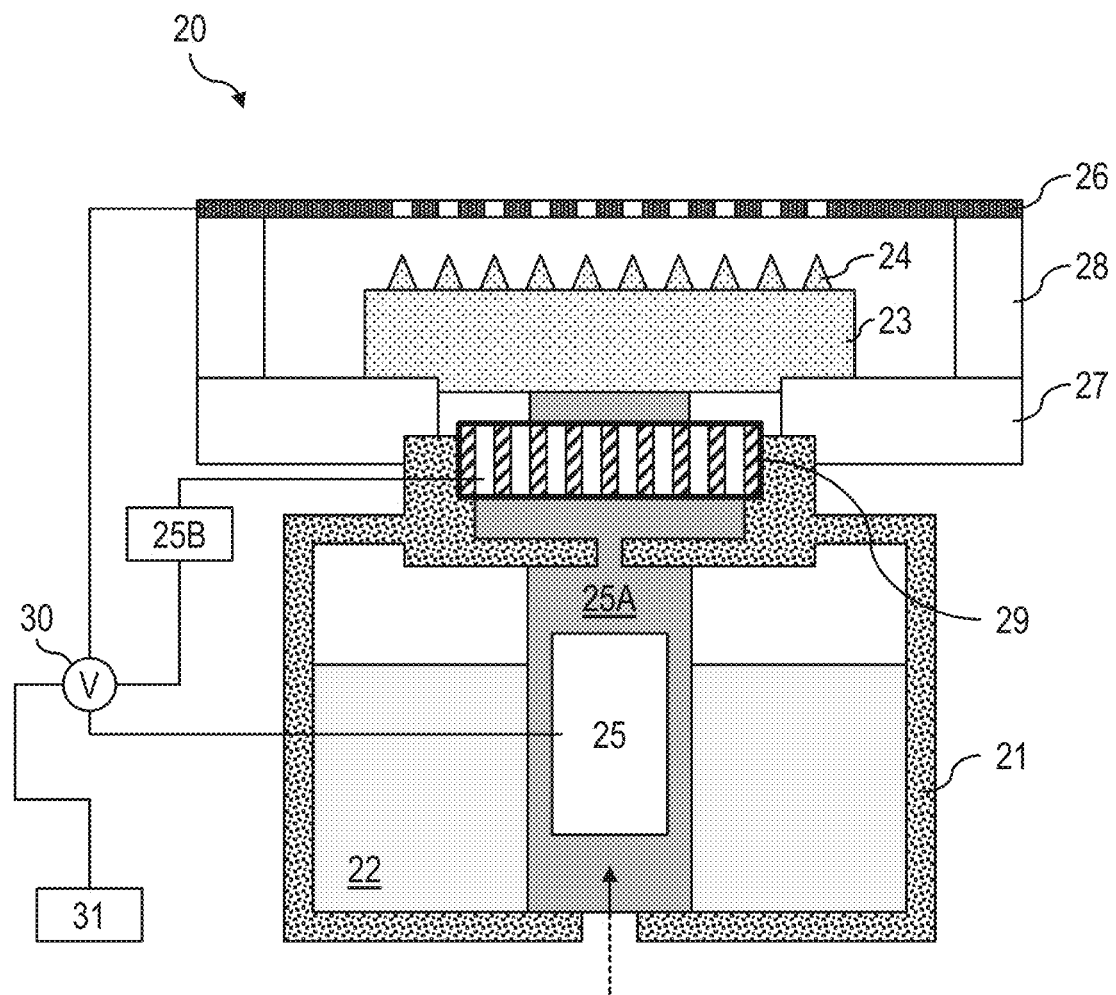
FIG. 4 shows, according to other embodiments, a prior art propulsion system.

FIG. 4 shows another prior art propulsion system 20, which may include an electrically-actuated valve 29 to fluidically connect the reservoir 21 with the emitters 24. In some cases, the propulsion system 20 may also include one or more wicks 25A to promote passive fluid flow from the reservoir 21 to the emitters. The valve 29 may be used to physically isolate the reservoir 21 from the external environment during storage and/or launch of the propulsion system on which the propulsion system 20 may be installed, prior to the deployment of the propulsion system. The propulsion system 20 may also include a switch 25B to electrically connect a power source 30 to the valve 29. It should be appreciated that valve 29 of propulsion system 20 shown in FIG. 4 may not be capable of any flow regulation, or adjustments in propellant feed rate to the emitters of a thruster during operation. In other words, after being actuated, the valve may remain in an open state with propellant disposed in the pores of the opened valve.

Figure 5:
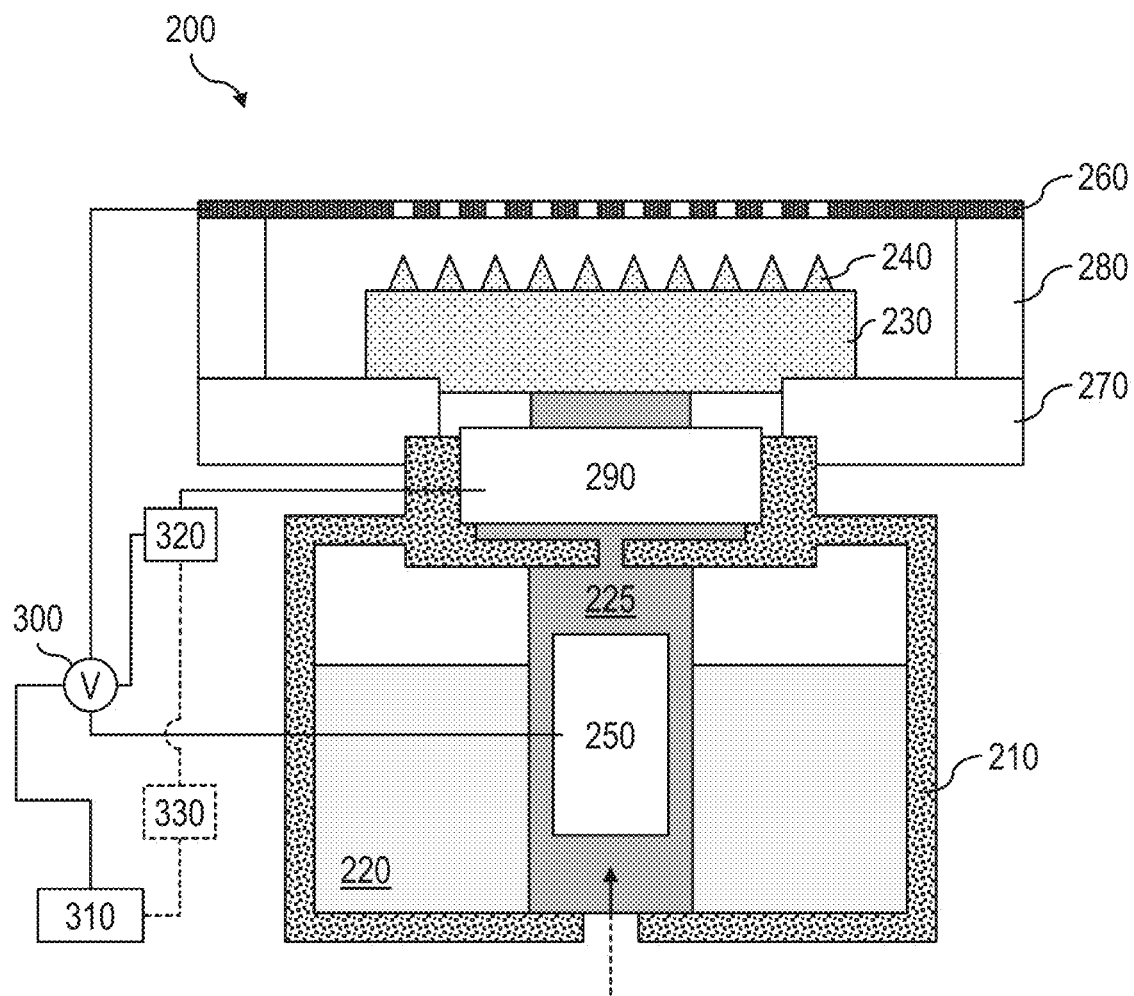
FIG. 5 shows, according to some embodiments, a propulsion system.

FIG. 5 shows a propulsion system 200 according to embodiments described herein. The propulsion system may include a thruster with one or more emitters 240 extending from an emitter base 230 and a pair of electrodes 250, 260 to apply a voltage differential (from power source 300) to a propellant 220 housed in a reservoir 210. The propulsion system 200 may include an electrically-actuated valve 290 located in the flow path of the propellant 220 between the reservoir 210 and the emitters 240. As will be described in greater detail below, the valve 290 may be capable of controlling propellant flow from the reservoir to the emitters. In some embodiments, one or more wicks 225 may be in fluid communication with an upstream portion, or inlet of the valve, and the reservoir to facilitate propellant flow from the reservoir 210 to the valve 290. The one or more wicks 225 may also be disposed between a downstream portion, or outlet of the valve, and the one or more emitters such that the valve is in fluid communication with the emitters 240 and emitter base 230. Electrode 260, which may also be referred to as an extractor electrode, may be supported by an insulating spacer 280 and support 270 layers to electrically isolate the electrode 260 from the thruster.

In some embodiments, the propulsion system 200 may include one or more controllers 310. The one or more controllers may be operatively connected to the power source 300 and/or any other electrical components 320 (e.g., a shunt resistor, switch, a secondary power source, etc.) of the system. The one or more controllers 310 may include at least one processor and associated non-transitory computer readable storage medium which may store instructions that when executed by the at least one processor change one or more operating states of the various power sources, electrical components, and/or other appropriate components of a propulsion system to commence nominal operation of the one or more thrusters of the propulsion system as described herein. It should be appreciated that although a single power source 300 is shown in FIG. 5, the propulsion systems of the present disclosure may employ any suitable number and/or arrangements of power sources and electrical components (e.g., controllers, switches, resistors, etc.).

In some embodiments, the one or more controllers 310 may include at least one processor and associated non-transitory computer readable storage medium which may store instructions that when executed by the at least one processor change one or more operating states of the various power sources, electrical components, and/or other appropriate components of a propulsion system to actuate the electrically-actuated valves to initiate flow of a propellant from a reservoir through the valve and to a thruster prior to commencing nominal operation of the one or more thrusters of the propulsion system as described herein.

Figure 6:
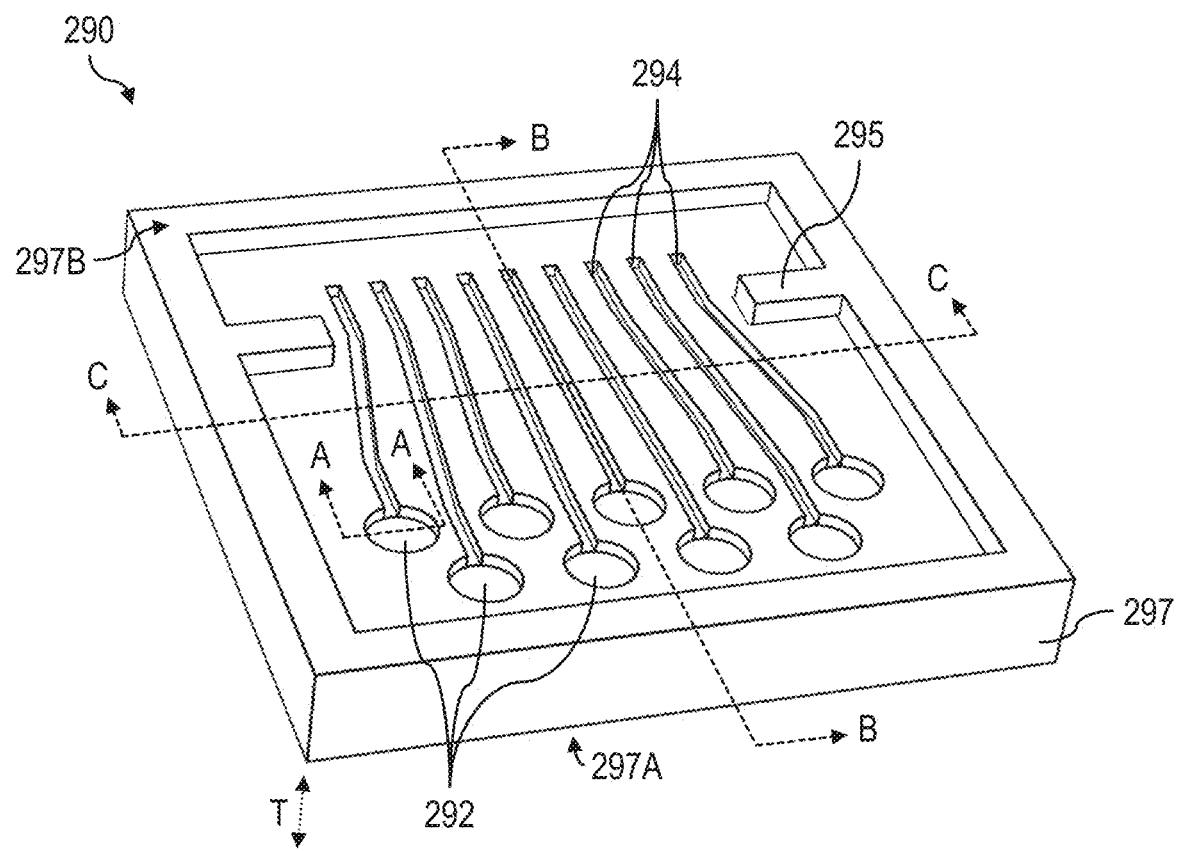
FIG. 6 shows, according to some embodiments, a top perspective view of an electrically-actuated valve for a propulsion system.

FIG. 6 shows an electrically-actuated valve 290 according to some embodiments. The valve 290 may include one or more through holes 292 and channels 294 formed in a body 297. The body may include a first surface 297A, interfacing with propellant flowing from a reservoir tank, as well as a second surface 297B, positioned downstream from the first surface 297A. In some embodiments, the first and second surfaces may be located opposite from one another on opposite sides of the valve. In some embodiments, one or more wicks may interface with the first surface 297A (facilitating propellant flow from the reservoir to the valve 290) as well as the second surface 297B (facilitating propellant flow away from the valve 290 to the emitters). In some embodiments, the valve 290 may include one or more alignment features 295 to help position the one or more wicks on the valve body 297. It should be appreciated that the valve 290 may include any suitable structures or features to facilitate its installation within an electrical propulsion system in between the flow path of the propellant reservoir and emitters.

As shown in FIG. 6, through holes 292 may extend from the first surface 297A to the second surface 297B of the valve 290. In other words, the through holes 292 may extend through the entire thickness (shown as axis T in FIG. 6) of the valve body 297. In some embodiments, channels 294 may be formed only on one surface of the valve (e.g., second surface 297B). Each channel 294 may be connected to at least one through hole 292 at least at one point of the through hole 292. As will be described in greater detail below, in certain modes of operation, propellant may flow from a reservoir, through one or more wicks to the through holes 292, through the through holes 292, across the channels 294, and towards the emitters through one or more wicks. It should be appreciated that in some embodiments, the wick (s) connecting the valve 290 to the emitters may not be in fluid communication with the through holes 292. Accordingly, propellant may only flow to the emitter after it has flowed through the channels 294, as will be described in greater detail below.

It should be appreciated that FIG. 6 depicts a simplified valve 290 for explanation purposes only. Accordingly, the valve 290 may include one or more features and structures for ease of physical installation, electrical connection, stability, reduction of weight, and/or any other desirable property of the valve.

Figure 7:
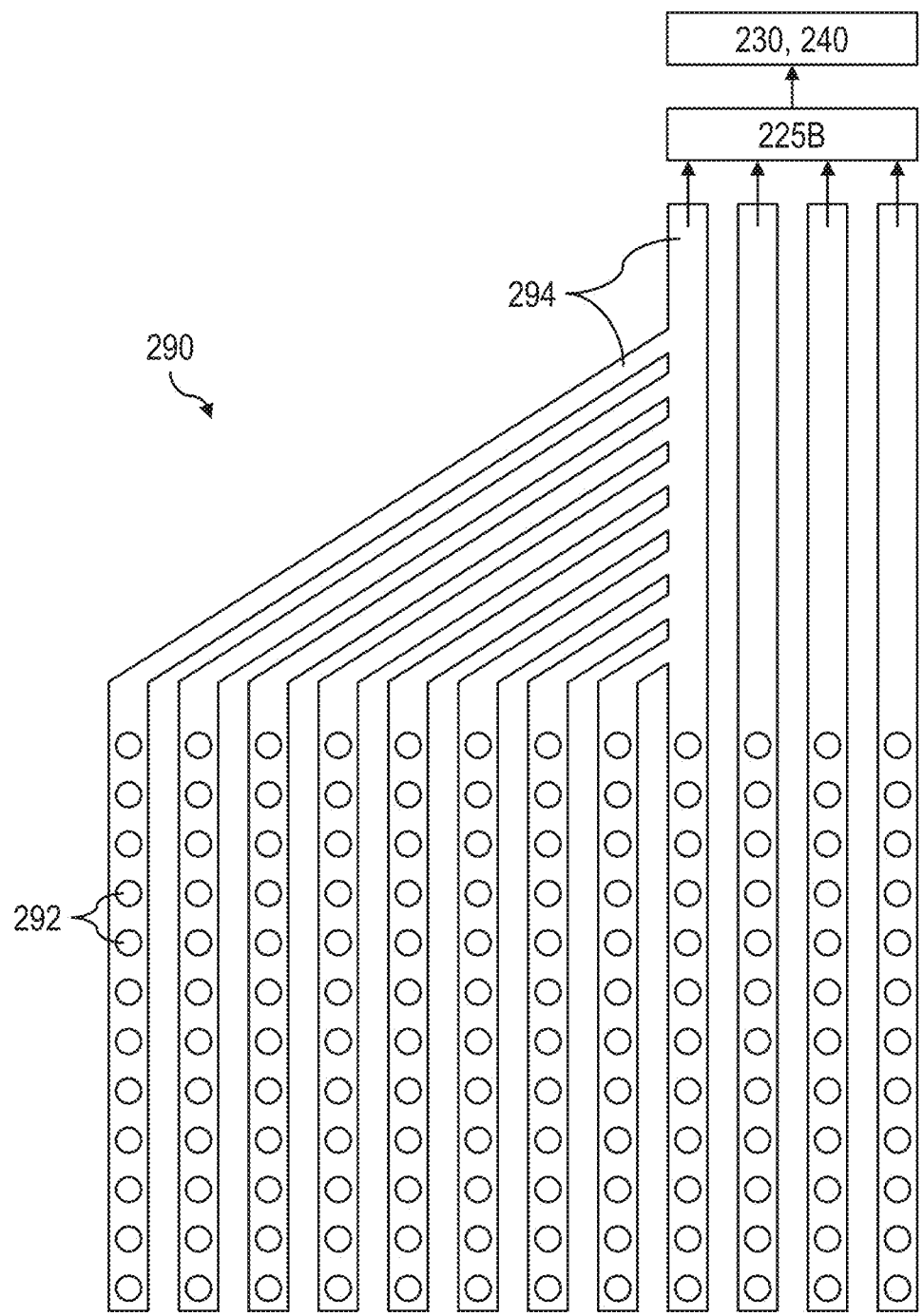
FIG. 7 shows, according to other embodiments, a partial top view of an electrically-actuated valve for a propulsion system.

FIG. 7 shows a partial top view of an electrically-actuated valve 290 with an alternative arrangement of through holes 292 and channels 294. In the figure, more than one through hole 292 is associated (e.g., fluidically connected, when the valve is activated) with a single channel 294. To maximize volumetric flow through the valve and minimize the overall footprint of the valve, multiple channels may converge, permitting propellant to flow from the reservoir, through the valve 290, through the one or more wicks 225B, and towards the emitter base 230 and emitters 240 during operation. In some embodiments, each through hole may be associated (e.g., fluidically connected, when the valve is activated) with more than one channel. In other embodiments, multiple through holes may each be associated with multiple channels. It should be appreciated that the present disclosure is not limited by the arrangement (e.g., location, distribution, density, spacing, etc.) of the channels and through holes.

It should be also be appreciated that although the through holes 292 are shown to be circular in shape, the valve 290 may include through holes of any suitable shape (e.g., elliptical, triangular, square-shaped, frustrated pyramidal, etc.), size, and/or arrangement (e.g., through holes localized on a portion of the valve, through holes dispersed along multiple portions of the valve, through holes dispersed along the entire body of the valve, etc.). It should also be appreciated that the through holes and channels of the valve in the present disclosure are not limited by size, arrangement, distribution, variation (e.g., through holes of different sizes on the same valve), and/or any other parameter.

Figure 8:
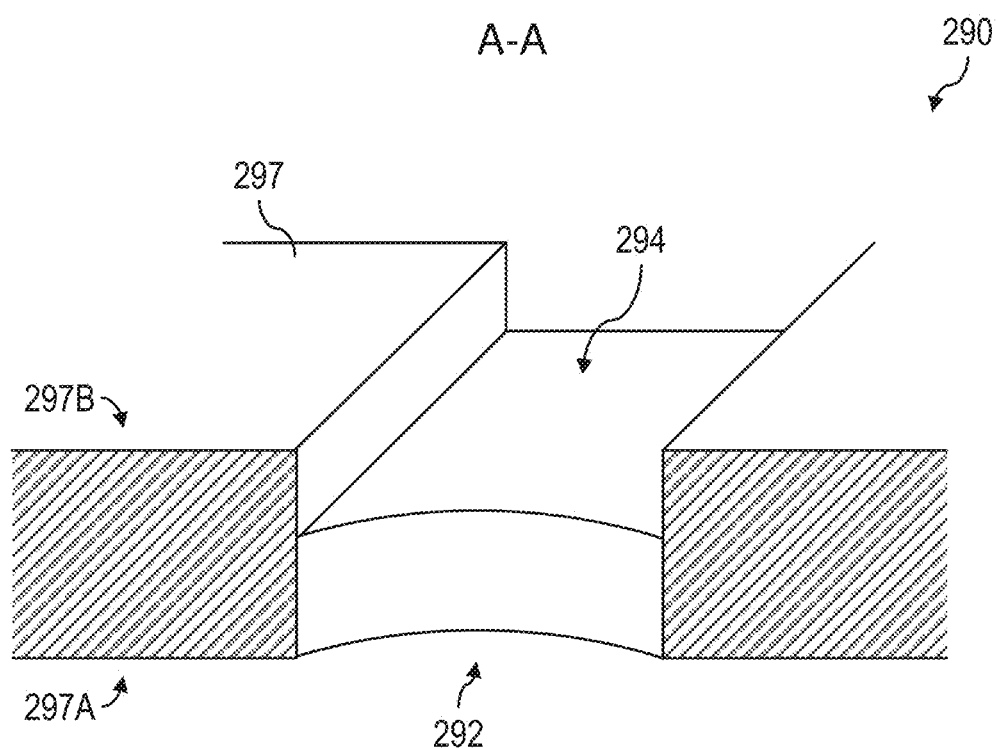
FIG. 8 shows, according to some embodiments, a cross-section of the electrowetting valve of FIG. 6 taken along line A-A.

FIG. 8 shows a cross-section of a valve 290 taken along line A-A of FIG. 6. As shown in the figure, in some embodiments, through holes 292 extend through a valve body 297, passing from a first surface 297A to a second surface 297B. In contrast, channels 294 may be formed only on one surface (e.g., surface 297B as shown in FIG. 8). As discussed previously, it should be appreciated that although a single through hole 292 is shown to be connected to a single channel 294, any suitable arrangement of through holes and channels may be employed to achieve a desired propellant flow rate through the valve and/or to minimize the valve's footprint.

Figure 9A:
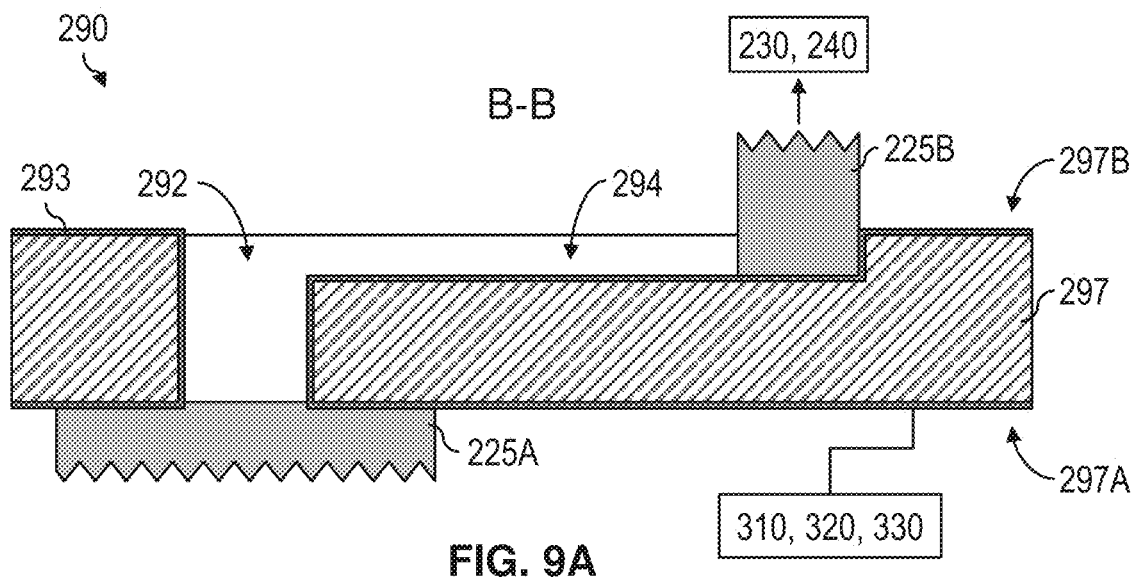
FIGS. 9A-9D show, according to some embodiments, a cross-section view of the of FIG. 6 taken along line B-B, showing a process of operation of the electrically-actuated valve.

FIG. 9A shows a cross-section of an electrically-actuated valve 290 taken along line B-B of FIG. 6. As shown in the figure, in some embodiments, through holes 292 may be connected to one or more wicks 225A to facilitate propellant flow from a propellant reservoir to the valve 290. Channels 294, which may be fluidically connected to the through holes 292, may also be connected to one or more wicks 225B to facilitate propellant flow away from the valve 290 towards the emitter base 230 and emitters 240 (see FIG. 5). As will be described in greater detail below, in some embodiments, the valve 290 may be activated by one or more controllers 310, controlling electrical communication between the valve 290 and power sources and/or electrical components (e.g., shunt resistor and/or switch).

In some embodiments, the valve 290 may be at least partially covered with a non-wetting layer 293. As discussed previously, the non-wetting layer 293 may be compatible with the propellant (which may be an ionic liquid), such that the layer does not substantially erode upon exposure to the propellant and/or environmental conditions under which the thruster is operated. In some embodiments, the propellant may exhibit a high contact angle (e.g., greater than 90°) on the non-wetting layer 293 prior to activation of the valve. Accordingly, the propellant may be inhibited from flowing into and/or through the valve prior to activation. In this way, the risk of premature wetting of the emitters may be reduced, and the propellant may be physically isolated from the emitters prior to operation of the thruster. In some embodiments, the non-wetting layer 293 may be formed of a fluoropolymer (e.g., $C_2F_{3.5}$ or polytetrafluoroethylene). The non-wetting layer may be any suitable material or combination of materials, and may be applied (e.g., grown, coated, dipped, etc.) with any suitable means, as the present disclosure is not so limited.

Figure 9B:
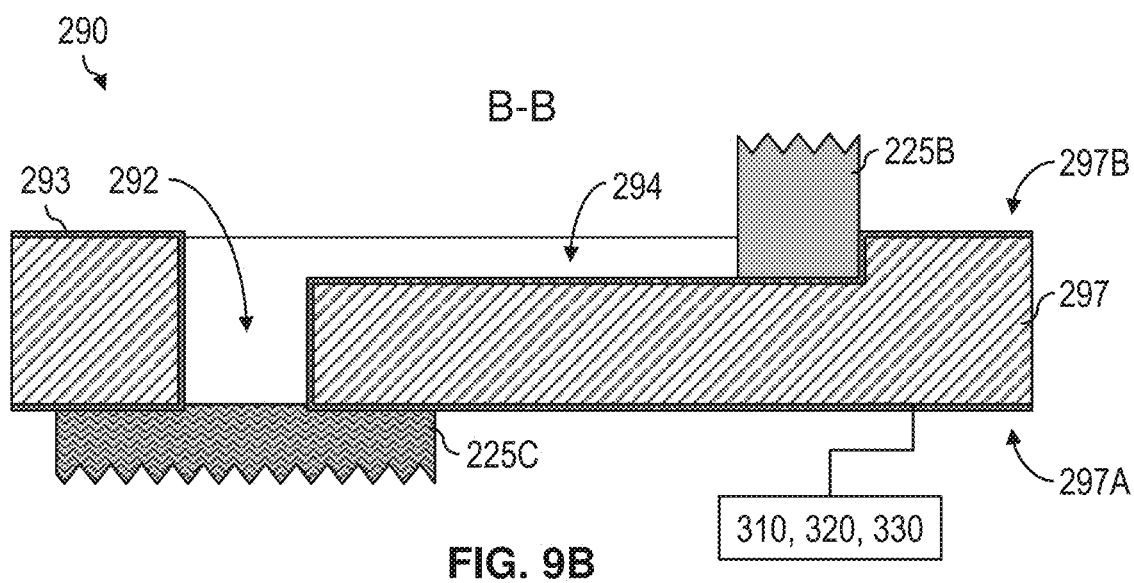
Figure 9C:
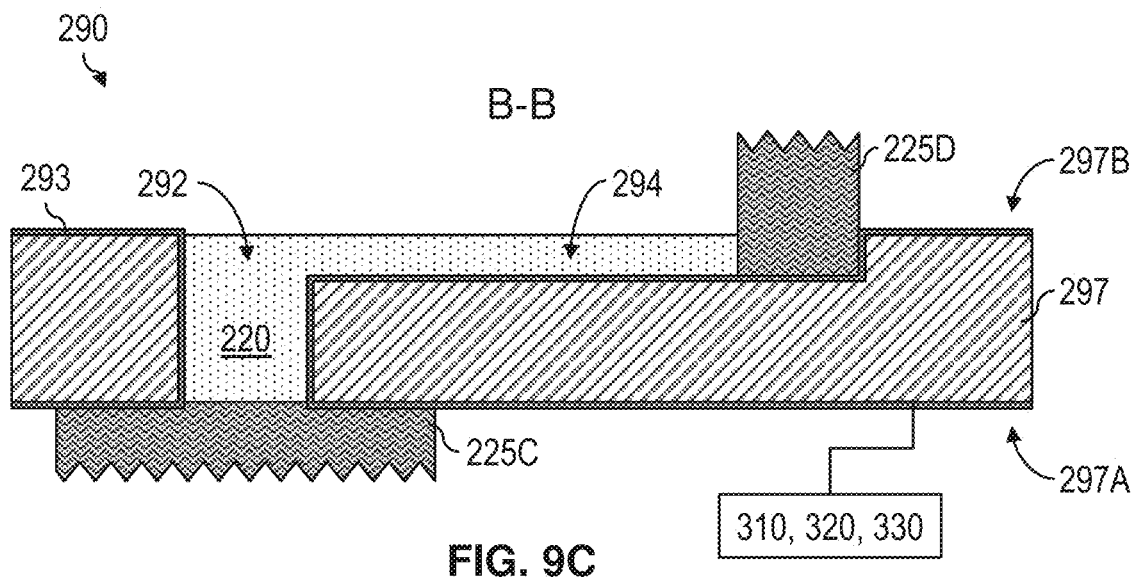
Figure 9D:
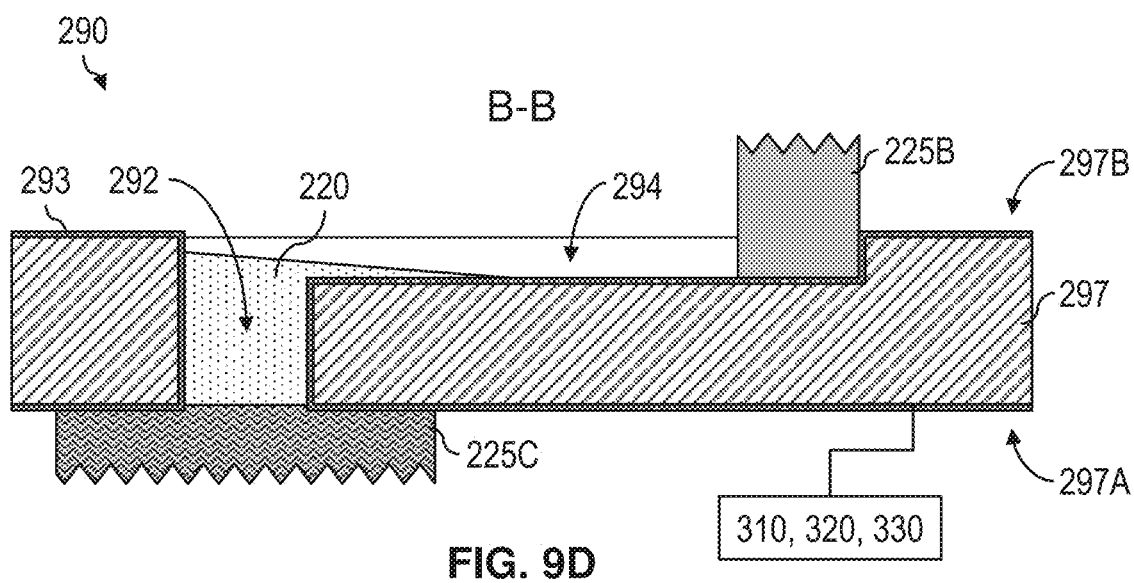

FIGS. 9B-9D depict a process of operation of the electrically-actuated valve 290. Prior to initial operation of the thruster (e.g., during storage or launch conditions), the propellant remains in the reservoir, and the through holes and channels remain substantially free of propellant. In some embodiments, the propellant may wet one or more wicks (propellant saturated wick(s) 225C shown in FIG. 9B) positioned in between the reservoir and the valve 290 prior to operation due to capillarity. However, due to the size of the through holes and/or channels, as well as the low surface energy of the non-wetting layer 293, the propellant may be substantially inhibited from flowing from the saturated wick (s) 225C into the through holes 292 and/or channels 294 prior to operation, when the valve 290 is inactive, which may be desirable during storage and/or launch of the propulsion system to reduce the risk of propellant flowing from a reservoir to the emitters.

FIG. 9C shows the valve 290 in an activated state, in which propellant may flow through the valve, towards the emitters. As such, an actuation potential may be applied to the valve via one or more power sources (e.g., power sources 300, 330) to increase the wettability of the valve (e.g., increase the contact angle of the propellant with respect to the valve) and permit the propellant to flow through the valve. Accordingly, as shown in FIG. 9C, propellant 220 may flow from propellant saturated wick(s) 225 through one or more through holes 292, across one or more channels 294, and up into propellant saturated wick(s) 225D towards the emitters. As discussed previously, in some embodiments, the emitters may be formed of a granular material, which may induce capillary flow of propellant through the emitters.

It should be appreciated that the flow rate of propellant 220 through the valve 290 may be controlled by competing factors such as a) evaporation of the propellant (e.g., ionic liquid) through the propulsion system and b) the wetting behavior of the valve. As noted previously, the wetting behavior of the valve (e.g., the contact angle of the propellant on the valve) may be tuned with variations in electrical potential applied to the valve. Accordingly, the valve may act as a regulator, controlling the magnitude of flow rate of the propellant. In other words, the hydraulic resistance of the valve may be tailored by adjusting the potential of the valve, to achieve a desired propellant flow rate. In some embodiments, the range of voltages used to adjust the propellant flow rate may be above a threshold potential required to activate the valve, permitting the propellant to wet the valve. In some embodiments, the threshold potential may be associated with the transition of a contact angle of a propellant, or other conductive fluid, from above 900 to below 90° relative to a surface of the valve.

FIG. 9D shows an inactivated valve 290, being grounded or having a voltage potential well below the threshold potential required for wetting the valve. Accordingly, the flow of propellant 220 may be significantly reduced, and in some embodiments, inhibited across the channels 294, which may be "open" to the propulsion system environment (e.g., under vacuum). It should be appreciated that the through holes 292 may remain filled with propellant due to the capillary effect, even when the valve is in a non-wetting configuration. Accordingly, when the valve 290 is inactivated following activation, the channels 294 may return back to their non-wetting state. The propellant 220 may then be depleted from the channel 294, flowing towards the wicks (propellant saturated wicks 225D in FIG. 9C or generally propellant-free wicks 225B in FIG. 9D). The non-wetting state of the channels 294 may inhibit propellant from flowing from the through holes 292 into the channel 294, such that the flow of propellant 220 to the emitters may be slowed and/or stopped following depletion. This break in propellant flow from the reservoir to the emitters may reduce the risk of emitter flooding, which may limit the operation of the propulsion system. In this way, the valve 290 may control the flow of propellant 220 from the reservoir to the emitters.

It should be appreciated that the flow rate of propellant 220 through the valve 290 may be controlled by competing factors such as a) evaporation of the propellant (e.g., ionic liquid) through the thruster and b) the wetting behavior of the valve. As noted previously, the wetting behavior of the valve (e.g., the contact angle of the propellant on the valve) may be tuned with variations in electrical potential applied to the valve. Accordingly, the valve may act as a regulator, controlling the magnitude of flow rate of the propellant. In other words, the hydraulic resistance of the valve may be tailored by adjusting the potential of the valve, to achieve a desired propellant flow rate. In some embodiments, the range of voltages used to adjust the propellant flow rate may be above a threshold potential required to activate the valve, permitting the propellant to wet the valve. In some embodiments, the threshold potential may be associated with the transition of contact angle from above 90° to below 90°.

Turning back to FIG. 5, in some embodiments, a single power source 300 may be used to operate the thrusters (e.g., apply a bias across electrodes 250, 260) and actuate the valve 290. The power source 300 may apply a voltage potential across electrodes 250, 260 of any suitable magnitude, including, but not limited to, between 500 V and 5 kV to extract ions out of electrode 260, resulting in thrust. While this voltage may be suitable for operation of the thruster, in some embodiments, such high voltages may be greater than a breakdown voltage of a dielectric layer in the valve, resulting in undesirable short circuiting within the valve. For example, in some embodiments, the valve may include a silicon oxide layer approximately 2 microns in thickness. Given the dielectric strength of silicon oxide being approximately 1 kV per micron, an operational voltage of 2 kV for the thruster may break down the silicon oxide layer and render the valve inoperable. It should be appreciated that in some embodiments, the operational voltage potential of the valve may be an order of magnitude lower than the operational voltage potential of the thruster (e.g., 100 V).

Accordingly, in order to reduce the risk of breakdown of the dielectric layer, the valve may be connected to one or more electrical components 320, to control the relative potential of the valve 290 relative to the propellant and/or other components of the system, as shown in FIG. 5. In some embodiments, electrical components 320 may include a shunt resistor, which may reduce the risk of short circuit within the entire thruster system upon valve failure. The valve 290 may be connected to the power source 300 through the shunt resistor, such that the voltage potential applied to the extractor electrode 260 during operation of the propulsion system 200 will also be applied to the valve 290. However, the shunt resistor may permit accumulated charge on the valve to be appropriately discharged to the power source and/or extractor electrode through the shunt resistor to avoid potential electrical shorting within the system.

In some embodiments, electrical components 320 may include a switch, which may be selectively opened or closed (e.g., with controllers 310) to electrically connect or disconnect the valve from the power source. In some embodiments, the switch may be connected to a ground state in its "open" state, removing the potential difference that inducing wetting within the channels of the valve. The switch may be "closed" to apply a desired voltage potential to the valve relative to the propellant to facilitate flow through the valve.

In some embodiments, the switch may be used to modify the voltage applied to the valve to permit the valve to operate as a flow regulator. For example, controllers 310 may modulate the switch (connected to a power source 300 and ground) by creating a duty cycle. The switch may be switched on and off for variable periods of time, to adjust the wettability of the valve. For example, longer off times of the switch (wherein the valve is grounded and/or at a voltage potential below the threshold required for wetting) may result in lower flow rates of the propellant through the valve, and subsequently to the thruster. In this way, the voltage potential of the valve may be modified to control the wettability of the open channels within the valve, without affecting the operation of the propulsion system. In some embodiments, controlling the flow rate of propellant fed to the emitters may change the composition of the ion beam emitted from the thruster in a controllable manner and/or help module the current emitted by the thruster.

In some embodiments, the valve may be connected to a second power source (e.g., power source 330 shown in FIG.

5), which may be selectively operated by one or more controllers 310 to apply a desired voltage potential to the valve relative to the propellant to activate the valve and permit propellant to flow towards the emitters. In some embodiments, the second power source may have the additional benefit of reducing the voltage applied to the valve relative to the electrodes of the thruster, which may improve the longevity of the valve.

It should be understood that while the various electrical component(s) and power source arrangements have been described relative to different embodiments, the electrical component(s) and power source arrangements may be used with any appropriate arrangement of the propulsion systems and corresponding valves described herein as the disclosure is not limited to only the specific embodiments described herein.

Figure 10A:
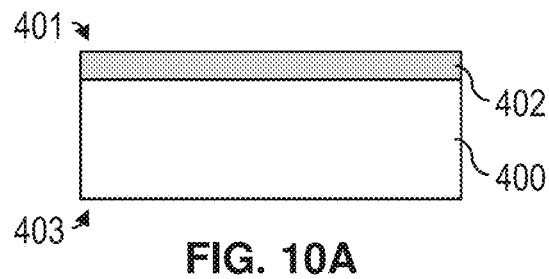
FIGS. 10A-10G show, according to some embodiments, a process of fabricating an electrically-actuated valve.
Figure 10E:
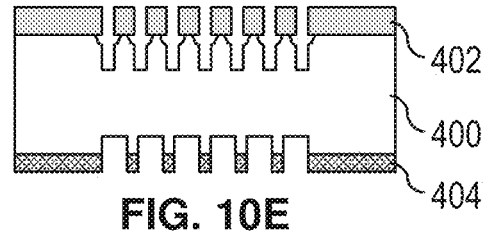
Figure 10B:
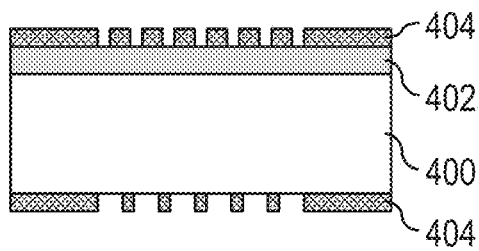
Figure 10F:
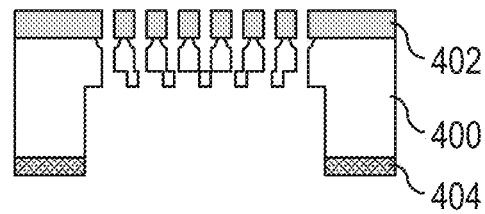
Figure 10C:
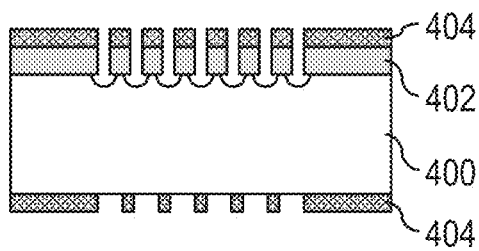
Figure 10G:
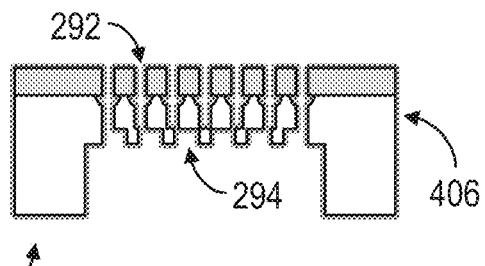
Figure 10D:
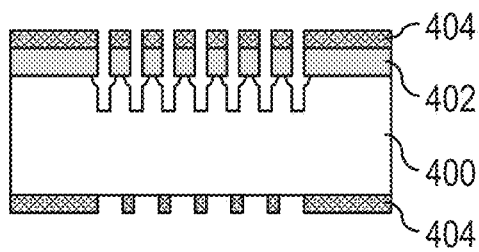

FIGS. 10A-10G show a process of fabricating a valve 290 according to some embodiments. As shown in FIG. 10A, the fabrication process may employ a wafer substrate 400 with a second surface 401 and first surface 403, both of which may be polished to improve geometric accuracy of the small features of the valve. The wafer substrate 400 may be cleaned prior to deposition of an oxide layer 402 to assist in subsequent selective etching processes. As shown in FIG. 10B, the wafer substrate may be coated with a photosensitive layer 404 (e.g., photoresist) on both the second surface and the first surface. The layers may be patterned based on the desired arrangement of the through holes (which may be formed on the second surface) and open channels (which may be formed on the first surface). In FIG. 10C, the underlying dielectric layer 402 may be etched (using, for example, dry etching with $CHF_3$) in accordance with the pattern formed on the photosensitive layer 404, followed by an undercut etch (using, for example, an isotropic $SF_6$ etch) into the wafer 400. As shown in FIG. 10D, the undercut etch may be extended into the wafer 400 to a suitable depth (e.g., the length of the final through holes). In some embodiments, the through holes may be etched 250 µm into the wafer substrate 400. As shown in FIG. 10E, the first surface of the wafer may then be etched to achieve a desired open channel geometry. In some embodiments, the channel depth may be 10 µm into the wafer 400. The photosensitive layer of both sides of the wafer may be stripped at this stage.

As noted previously, in some embodiments, the valve may include one or more alignment features for wicks to be installed on the valve, facilitating propellant flow away from the valve. Accordingly, as shown in FIG. 10F, a new photosensitive layer 404 may be applied to the first surface and patterned to match the alignment features of the valve. It should be appreciated that the etching process involved to form the alignment features may also propagate the channels through the wafer substrate 400, such that the open channels may be in fluid communication with the through holes formed on the second surface of the wafer substrate. The wafer may then be stripped of all photosensitive layers and cleaned in preparation for deposition (e.g., growth) of a dielectric layer and a non-wetting layer, both of which are represented as layer 406 in FIG. 10G. The channels 294 may be formed in the first surface (see surface 403 in FIG. 10A) of the valve 290, and the through holes 292 may be formed in the second surface (see surface 401 in FIG. 10A) of the valve 290. It should be appreciated that the valve may be oriented in any suitable manner to facilitate fabrication, and may be re-oriented (or maintained in the same orientation) during operation of the electrical propulsion system in which it may be installed. In some embodiments, these layers may be conformally grown about all the exposed surfaces of the valve 290. In other embodiments, the dielectric layer and/or non-wetting layer (and/or any other suitable coatings which may be deposited on the valve for desirable operation) may be formed at precise regions of the valve (e.g., only in the open channels and through holes).

As described previously, the valves described herein may employ any suitable thickness of any suitable dielectric material and/or non-wetting layer, deposited on the valve 290 with any suitable method known in the art. For example, the dielectric layer may be a thermally grown silicon oxide layer with a thickness of 2 µm, and the non-wetting layer may be 400 nm of a fluoropolymer deposited using a chemical or physical vapor deposition process (e.g., PECVD).

It should be appreciated that the fabrication process outlined in FIGS. 10A-10G are for explanation purposes only, and may include steps not shown or described. It should also be appreciated that the final valve structure 290 shown in FIG. 10G may be achieved with any other process and/or order of processes, as the present disclosure is not limited by the fabrication process of the valve 290. For example, any appropriate method of forming a dielectric layer on the exposed surfaces of a valve, including in some embodiments the exposed surfaces within the through holes and/or open channels of a valve, may be used. In some embodiments, an oxide layer may be formed on one or more surfaces of the valve as described above, using: a wet thermal oxidation process where a mixture of hydrogen and oxygen at temperatures greater than 1000° C. form steam and the water vapor may diffuse rapidly into a wafer substrate, such as silicon, more rapidly than does molecular oxygen; a dry thermal oxidation process where a wafer substrate is exposed to a substantially pure oxygen atmosphere at a similarly elevated temperatures greater than about 1000° C.; a chemical vapor deposition process with no biasing voltage applied to produce a conformal coating; anodic oxidation of a metallic substrate; and/or any other appropriate oxidation method as the disclosure is not limited in this fashion.

It should be appreciated that the etching processes described above may be performed using any appropriate method for a given wafer substrate material. However, in some embodiments, appropriate isotropic etching methods may include: plasma etching with sulfur hexafluoride (SF6) with no biasing voltage; etching with xenon difluoride (XeF2); isotropic wet etching using any appropriate etchant, including, for example, HNA (a mixture of hydrofluoric, nitric, and acetic acid); a partially isotropic wet etch using tetramethylammonium hydroxide (TMAH), which has a 37:1 selectivity depending on the crystal plane, which may produce a steep-walled conical or pyramidal etch; and/or any other appropriate anisotropic etch capable of being used with a given substrate and dielectric material.

Similarly, any appropriate anisotropic etch may be used to form the through holes and/or open channels in a substrate. For example, in some embodiments, appropriate, anisotropic etches may include, but are not limited to, a Bosch deep reactive ion etch (DRIE) process which alternates SF6 etching with C4F8 passivation steps; a potassium hydroxide wet etch, which exhibits a 400:1 crystal plane selectivity; and/or any other appropriate anisotropic etching method. Of course, while the use of an anisotropic etching method may be beneficial, in some embodiments, the above-noted isotropic etch may be used exclusively to produce the desired through holes and/or open channels.

While the use of etching processes is described above, in instances where difficult to etch materials are used, different processes may be used to form the desired through holes and/or open channels. For example, ion beam milling may be used in some embodiments to form the desired through holes and/or open channels in a wafer substrate. Alternatively, in some embodiments, electrochemical etching may also be used on certain substrates such as metallic or other sufficiently conductive substrates to form the desired through holes and/or open channels.

It should also be appreciated that the fabrication process may not be limited by the patterning processes outlined previously. For example, in some embodiments, a mask may be used to pattern a valve may include, but is not limited to, glass mask, polymer mask, metallic mask, and/or any other appropriate type of mask. Further, in some embodiments, a mask, and the methods used to remove the mask from the wafer substrate, may be selected to be compatible with the valve and other layers disposed thereon to reduce the risk of damage during mask application and removal. However, embodiments in which a mask is not used when forming the desired through holes and/or channels are also contemplated. For example, a laser rastering system may be used to form the desired number of through holes and/or channels in a wafer substrate.

Figure 11A:
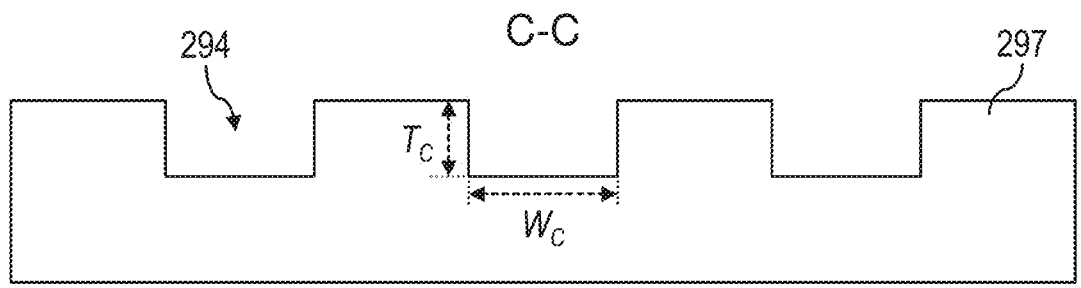
FIGS. 11A-11C show, according to some embodiments, cross-sectional views of the electrowetting valve of FIG. 6 taken along line C-C.
Figure 11B:
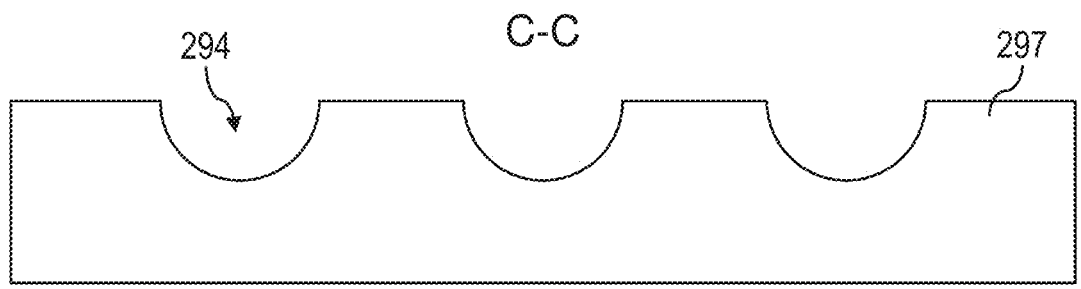
Figure 11C:
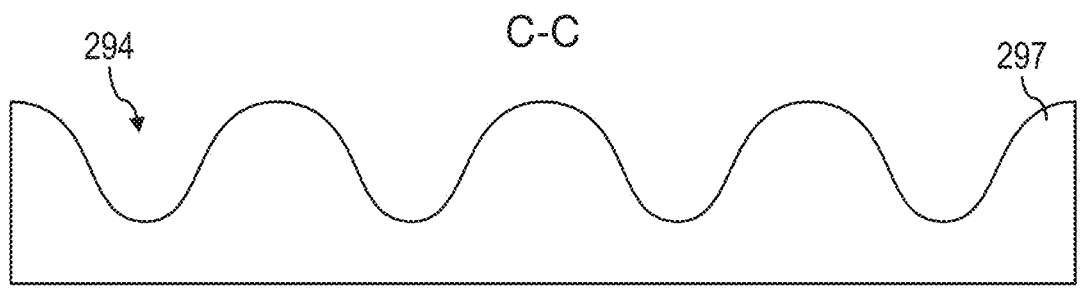

The geometry of open channels in a valve may influence the wetting behavior of propellant flowing across the channel. For example, the channels may include one or more pinning sites, which may enhance the wettability of the channels. FIGS. 11A-11C depict a few variations on the cross-section of open channels 294, taken across line C-C of FIG. 6. In some embodiments, as shown in FIG. 11A, the open channels 294 may exhibit a substantially square wave shaped cross section. Each channel 294 may have a thickness $T_C$ and width $W_C$. In some embodiments, the ratio of channel thickness to width may be less than one, to facilitate propellant flow through the open channels when the valve is activated. In some embodiments, the geometry of the open channel may be selected to achieve a desired capillary number, representing the relationship between viscous drag forces of the propellant in the open channel and the surface tension of the propellant in the environment of the propulsion system. Accordingly, the open channels 294 of the present disclosure may not be limited by any particular geometry or geometric ratio, as the channels may be designed for desired operation of a desired thruster type and propellant combination. In some embodiments, as shown in FIG. 11B, the open channels 294 may be formed with semi-circular, or rounded, cross-sections. The removal of internal sharp corners of the channels may permit more fluid to flow through the channel, limiting flow rate by only the voltage potential of the valve relative to the propellant. In some embodiments, as shown in FIG. 11C, the open channels 294 may be formed with sinusoidal and/or curved cross-sections, eliminating sharp corners all together. It should be appreciated that the open channels of the present disclosure are not limited by cross-sectional geometry of the channels, and that any suitable geometry—which may be feasible with existing microfabrication techniques, and which may result in desired wetting properties of the open channels—may be employed.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips. GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories. RAM, ROM. EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The invention claimed is:

1. A propulsion system comprising:
a reservoir tank configured to hold a propellant;
at least one thruster;
at least one valve positioned along a flow path between the reservoir tank and the at least one thruster, the at least one valve comprising:
one or more through holes extending from a first surface of the at least one valve to a second surface of the at least one valve, and
one or more channels fluidly connected to the one or more through holes; and
a first power source electrically connected to the propellant and the at least one valve,
wherein in a first operating mode the first power source is configured to apply a first voltage potential to the at least one valve relative to the propellant to inhibit propellant flow through at least a portion of the at least one valve, and wherein in a second mode of operation the first power source is configured to apply a second voltage potential to the at least one valve relative to the propellant to permit propellant flow through at least a portion of the at least one valve.

2. The propulsion system of claim 1, wherein the one or more channels comprise a plurality of channels, and wherein the one or more through holes comprise a plurality of through holes.

3. The propulsion system of claim 1, wherein the at least one valve comprises:
a conductive substrate comprising the one or more through holes and the one or more channels;
at least one dielectric layer disposed at least partially on the conductive substrate; and
at least one non-wetting layer disposed at least partially on the at least one dielectric layer,
wherein the propellant exhibits a larger contact angle on the at least one non-wetting layer than on the at least one dielectric layer and/or the conductive substrate.

4. The propulsion system of claim 1, wherein the at least one valve comprises:
a conductive substrate comprising the one or more through holes and the one or more channels; and
at least one dielectric layer disposed at least partially on the conductive substrate,
wherein the propellant exhibits a non-wetting contact angle on the at least one dielectric layer.

5. The propulsion system of claim 1, wherein the at least one valve comprises:
a substrate comprising the one or more through holes and the one or more channels;
at least one conductive layer disposed on one or more surfaces of each of the one or more through holes and/or one or more channels;
at least one dielectric layer disposed at least partially on the at least one conductive layer; and
at least one non-wetting layer disposed at least partially on the at least one dielectric layer,
wherein the propellant exhibits a larger contact angle on the at least one non-wetting layer than on the at least one dielectric layer and/or the at least one conductive layer.

6. The propulsion system of claim 1, further comprising a second power source electrically connected to the propellant and the at least one thruster.

7. The propulsion system of claim 6, further comprising one or more controllers configured to control the second power source to adjust a magnitude of the second voltage potential.

8. The propulsion system of claim 1, further comprising a shunt resistor, wherein the first power source is connected to the at least one valve through the shunt resistor.

9. The propulsion system of claim 1, further comprising a switch configured to selectively connect the first power source to the at least one valve.

10. A valve comprising:
   a substrate;
   one or more through holes extending from a first surface of the substrate to a second surface of the substrate;
   one or more channels partially extending into the second surface of the substrate and fluidly connected to the one or more through holes; and
   one or more layers disposed on at least a portion of the substrate including the one or more channels and/or the one or more through holes,
   wherein the one or more layers are configured to electrically isolate the one or more through holes and the one or more channels from the substrate, and wherein the one or more layers are configured to provide a non-wetting surface on the one or more through holes and the one or more channels.

11. The valve of claim 10, wherein the one or more layers comprise:
   at least one dielectric layer; and
   at least one non-wetting layer disposed at least partially on the at least one dielectric layer,
   wherein a conductive liquid exhibits a larger contact angle on the at least one non-wetting layer than on the at least one dielectric layer.

12. The valve of claim 10, wherein the substrate is formed of an electrically conductive and/or semiconducting material.

13. The valve of claim 10, wherein the one or more layers comprise at least one layer configured to both electrically isolate the one or more through holes and the one or more channels from the substrate and provide the non-wetting surface on the one or more through holes and the one or more channels.

14. The valve of claim 10, wherein the one or more channels comprise a plurality of channels, and wherein the one or more through holes comprise a plurality of through holes.

15. The valve of claim 10, further comprising a power source electrically connected to the substrate and a conductive liquid disposed on the one or more layers.

16. The valve of claim 15, wherein in a first operating mode the power source is configured to apply a first voltage potential to the substrate relative to the conductive liquid to inhibit the conductive liquid from flowing through at least a portion of the valve, and
   wherein in a second mode of operation the power source is configured to apply a second voltage potential to the valve relative to the conductive liquid to permit the conductive liquid to flow through at least a portion of the valve.

17. The valve of claim 11, wherein the conductive liquid is at least one selected from the group of an ionic liquid and a room temperature molten salt.

18. A method of operating a propulsion system, comprising:
   applying a voltage potential to at least one valve relative to a propellant;
   wetting one or more through holes extending from a first surface of the at least one valve to a second surface of the at least one valve in response to the applied voltage potential; and
   wetting one or more channels in fluid communication with the one or more through holes,
   wherein wetting the one or more through holes and wetting the one or more channels places the propellant in fluid communication with a thruster.

* * * * *